(12) United States Patent
New et al.

(10) Patent No.: US 10,409,084 B2
(45) Date of Patent: Sep. 10, 2019

(54) ALIGNMENT METHOD

(71) Applicant: Optalysys Ltd., Pontefract, West Yorkshire (GB)

(72) Inventors: Nicholas James New, Wakefield (GB); Robert Todd, Wakefield (GB)

(73) Assignee: Optalysys Ltd., Wakefield (GB)

(*) Notice: Subject to any disclaimer, the term of this patent is extended or adjusted under 35 U.S.C. 154(b) by 48 days.

(21) Appl. No.: 15/639,943

(22) Filed: Jun. 30, 2017

(65) Prior Publication Data

US 2017/0299882 A1    Oct. 19, 2017

Related U.S. Application Data

(63) Continuation of application No. PCT/GB2015/054058, filed on Dec. 17, 2015.

(51) Int. Cl.
| | | |
|---|---|---|
| *G01B 9/02* | (2006.01) | |
| *G02B 27/42* | (2006.01) | |
| *G02B 27/62* | (2006.01) | |
| *G01B 11/27* | (2006.01) | |

(52) U.S. Cl.
CPC ......... *G02B 27/4255* (2013.01); *G01B 11/27* (2013.01); *G02B 27/4233* (2013.01); *G02B 27/4272* (2013.01); *G02B 27/62* (2013.01)

(58) Field of Classification Search
CPC ............ G02B 27/4233; G02B 27/4255; G02B 27/4272; G02B 27/62; G01B 11/27; G01B 9/02016
USPC ........................................................ 356/521
See application file for complete search history.

(56) References Cited

U.S. PATENT DOCUMENTS

| | | | | |
|---|---|---|---|---|
| 5,325,176 A | * | 6/1994 | Suda ..................... | G03F 9/7076 356/400 |
| 5,340,992 A | * | 8/1994 | Matsugu ............... | G03F 9/7076 250/548 |
| 2006/0050986 A1 | | 3/2006 | New et al. | |
| 2008/0123105 A1 | * | 5/2008 | Seki ................... | G02B 27/4233 356/521 |
| 2010/0085496 A1 | | 4/2010 | New et al. | |

FOREIGN PATENT DOCUMENTS

| | | |
|---|---|---|
| EP | 1840630 A1 | 10/2007 |
| WO | 2014087126 A1 | 6/2014 |

\* cited by examiner

*Primary Examiner* — Dominic J Bologna
*Assistant Examiner* — Jonathon Cook
(74) *Attorney, Agent, or Firm* — Neil R. Jetter; Jetter & Associates, P.A.

(57) ABSTRACT

A method for assessing the relative alignment of a first and second diffractive element. The method includes illuminating the first diffractive element to form a first diffraction pattern in the far field and illuminating the second diffractive element to form a second diffraction pattern in the far field. The method further comprises determining a positional and/or rotational relationship between the first diffraction pattern and the second diffraction pattern in the far field.

20 Claims, 12 Drawing Sheets

ALIGNMENT METHOD

CROSS REFERENCE TO RELATED APPLICATIONS

This application is a continuation under 35 U.S.C. 111(a) of International (PCT) application number PCT/GB2015/054058 entitled "ALIGNMENT METHOD" that has an international filing date of Dec. 17, 2015 which claims priority to GB application number 1500285.0 filed on Jan. 8, 2015, both of which are incorporated herein in their entireties.

FIELD

The present disclosure relates to an alignment assessment method. In particular, the present disclosure relates to a method of assessing the relative alignment of a first and second diffractive element. More particularly, the present disclosure relates to a method of assessing the rotational or translational alignment of a first and second diffractive element. More particularly still, the present disclosure relates to a method of assessing the relative alignment of first and second spatial light modulators in an optical processing system, such as an optical correlator. The present disclosure also relates to a method of aligning a plurality of diffractive elements.

BACKGROUND

A common problem in the construction of optical systems is how to align multiple components accurately, to provide correct optical performance. In free space diffractive and Fourier optical systems, correct placement of devices and components is critical, particularly when the tolerances involved can be at the micron level. Each component can require accurate alignment along the six main axes, denoted as the three linear translations x,y,z, and the three angular translations roll, yaw, pitch, considered relative to a central point. This criterion is extended if there are subsystems within the overall optical system, when global axes should be considered in addition to the local axes for each component.

Particular difficulty lies in the alignment of a plurality of optically coupled diffractive elements such as pixelated electro-optical micro-display arrays, commonly grouped under the term Spatial Light Modulators (SLMs). These can be Liquid Crystal on Silicon (LCoS) devices or mirror-based Micro-Electro-Mechanical (MEMs) devices.

In diffractive optical systems, diffractive elements such as SLMs are employed not as a means to produce images, but as a way of modulating coherent laser light of wavelengths comparable to the size of the pixels (for example 632 nm red visible laser light). By addressing patterns to the SLM pixel array, the light exiting the device may be shaped (in the case of holographic reproduction and optical tweezer applications), or may be used to input numerical data into an optical processing system. Examples of such systems include optical correlators (pattern recognition) and optical derivative functions (as the basis of larger equation solving systems), such as those proposed in published patent application numbers US2010085496 and US2006050986. By addressing specific patterns such as zone plates, Fresnel lenses and phase ramps, SLMs may also be used in place of traditional focussing and beam steering elements (lenses, mirrors), as proposed in PCT/GB2013/051778.

Using these principles large component count diffractive optical systems may be realised using SLMs to both input data into the optical system, as well as to direct and focus the light as required. This has the significant advantage of the optical alignment becoming a software task, rather than a hardware task, since the patterns may be dynamically adjusted once the initial physical alignment is completed—and furthermore the system may be reconfigured to form other optical systems. However, the issue of how to physically align the SLMs remains. When considering that an optical partial differential equation solver system may need to contain over 200 SLMs, the difficulty in aligning such a quantity of components becomes apparent.

SUMMARY

Aspects of the present disclosure are defined in the appended independent claims. In summary, the present disclosure relates to a method to assess the physical alignment of diffractive elements such as SLMs in an optical processing system. This Summary is not intended to limit the claimed subject matter's scope.

Disclosed methods solve the above-described problem of assessing the relative alignment of two or more diffractive elements that enables improving the alignment of the two or more diffractive elements. It is recognized that it may be advantageous to provide arrays of diffractive elements in an optical processing system wherein individual diffractive elements are positioned in at least one tiled array in at least one plane. In such a tiled arrangement, the inventors have solved the problem of aligning the individual diffractive elements accurately so that the optical processing system may function accurately. It may be necessary to align individual diffractive elements in multiple axes with adjacent diffractive elements and other diffractive elements in the tiled array. Furthermore, arrays themselves may also need to be aligned with respect to other arrays. Determining the alignment of the diffractive elements in such a system is needed in order to carry out any such alignment.

The problem of determining the relative alignment of two or more diffractive elements is addressed by illuminating the diffractive elements to create light patterns in the far field such that a relative alignment of the light patterns can be compared in order to compare a relative alignment of the diffractive elements. The light patterns may be far field diffraction patterns and/or magnified images of the diffractive elements and a comparison of the light patterns may reveal information about the positional, translational and/or rotational alignment of the diffractive elements. 'Far field' or 'Fraunhofer diffraction' as known in the art and used herein is defined as being located at a distance L from the aperture or slit which is significantly greater than $W^2/\lambda$, where $\lambda$ is the wavelength of light and W is the largest dimension in the aperture or slit so that $W^2/L\lambda \ll 1$.

There is therefore provided a method of determining the relative alignment of a first and second diffractive element, the method includes illuminating the first diffractive element to form a first diffraction pattern in the far field, illuminating the second diffractive element to form a second diffraction pattern in the far field, and determining a positional and/or rotational relationship between the first diffraction pattern and the second diffraction pattern in the far field.

There is also provided a method of determining the relative alignment of a first and second diffractive element, the method including illuminating the first diffractive element to form a first image of the first diffractive element in the far field, illuminating the second diffractive element to form a second image of the second diffractive element in the far field, and determining a positional relationship between the first image and the second image in the far field.

Notably, during the assessment of the relative alignment of the diffractive elements in accordance with disclosed methods, the diffractive elements are not required to be powered. Advantageously, the present disclosure provides a non-contact and high-resolution method of assessing the relative alignment of two or more diffractive elements. Further advantageously, in the case of diffractive elements being used to form optical sub-systems, the method provides the means for the optical sub-systems themselves to be aligned with other optical sub-systems to form a larger optical system.

BRIEF DESCRIPTION OF THE DRAWINGS

Embodiments of the present disclosure will now be described with reference to the accompanying drawings in which:

FIG. 8c shows a scanned photograph of a far-field diffraction pattern of the type shown in FIG. 8b produced by an SLM possessing the structure shown in FIG. 8a;

In the figures, like reference numerals refer to like parts.

DETAILED DESCRIPTION OF EMBODIMENTS

Embodiments shall now be described in detail with reference to the figures.

Embodiments described herein refer to SLMs by way of non-limiting example only. The present disclosure is equally applicable to other diffractive elements such as those using static patterns printed or otherwise represented on a substrate. The present disclosure applies equally to assessing the relative alignment of a plurality of grids whose cells are of comparable size to the wavelength of light being passed through them, including those of camera sensors, such as CMOS or CCD sensors. It may therefore be understood that the present disclosure is applicable to diffractive elements.

The SLMs referred to herein may be of the type used in video projectors. They comprise pixelated grids of electrodes which are used to apply variable voltage levels to a layer of liquid crystal molecules. The size of the pixels can be as small as 3 microns by 3 microns. The SLM may be transmissive (where the light is projected through the device) or reflective (where the light is reflected by a mirror placed behind the pixelated grid). The resolutions available tend to follow the development of television displays, currently megapixel (1 million pixels) and above, with the 4k standard (3840×2160 pixels) being the current maximum. Furthermore, depending on the type of liquid crystal used and also the arrangement of polarisation filters and wave plates placed in the path of the input and exit beams, complex modulation (i.e. amplitude and phase) of the light can be achieved.

In overview, embodiments include a method for determining the rotational alignment of two or more diffractive elements by using the far field diffraction patterns produced by the diffraction of coherent light as it exits the diffractive elements. In embodiments, a relative alignment of the far field diffraction patterns created by the diffractive elements is observed in order to determine a relative rotational alignment of the diffractive elements in up to three axes. Further embodiments provide a method for determining the translational alignment of two or more diffractive elements by using the magnified images of the two or more diffractive elements projected a distance away from the devices. In embodiments, a relative alignment of the magnified images of the diffractive elements is used to determine the translational alignment of the diffractive elements in up to two axes. Further embodiments provide a planar alignment method in which the diffractive elements are attached to a precision machined support medium used to ensure the translational alignment of the diffractive elements in a further axis. The disclosed methods can be used either on their own or in combination. By combining methods, two or more diffractive elements can be aligned in one axis and assessment can be carried out as to the alignment in up to a further five axes.

Figure 1:
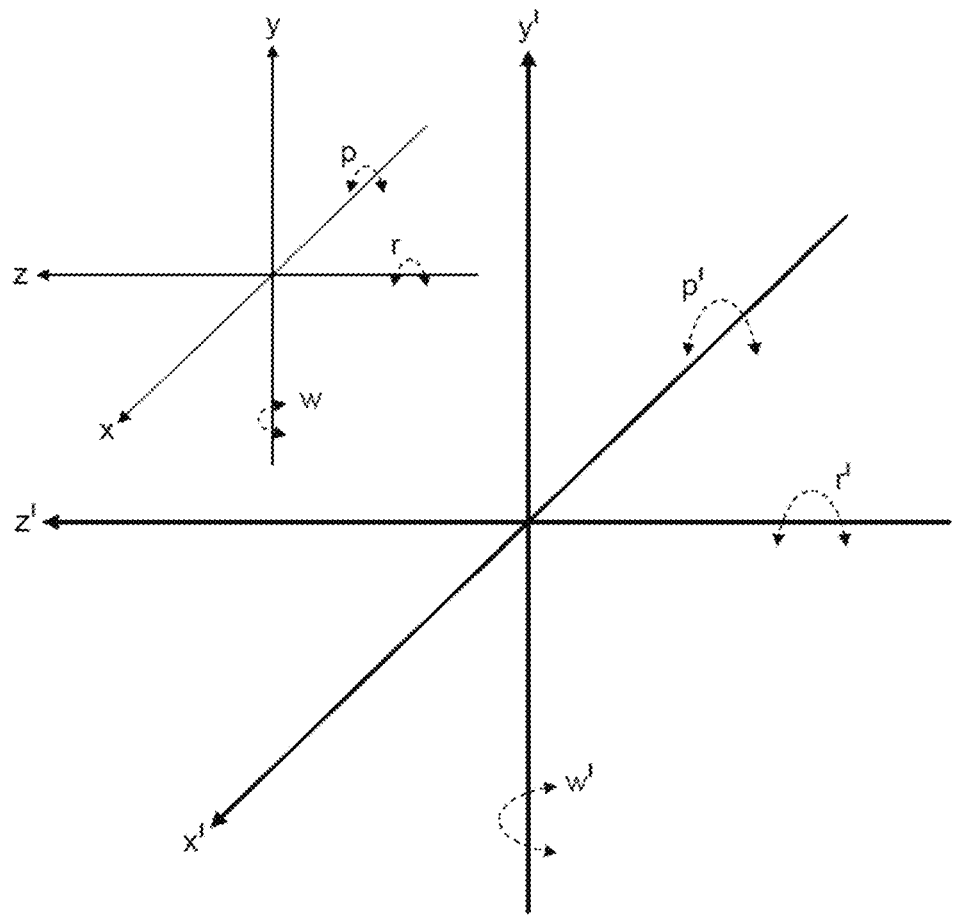
FIG. 1 shows six degrees of freedom that may be considered for each component in an optical system.

FIG. 1 shows six degrees of freedom that may be considered for each diffractive element, both in terms of the local co-ordinate system and the global co-ordinate system, where the diffractive elements form components which may be integrated into a sub-system, which should then itself be integrated into a larger system. FIG. 1 denotes the three linear translation axes x,y,z and the rotational axes, pitch, roll and yaw, p,r,w, with the global equivalents denoted as x',y',z',p',r',w'.

Figure 2:
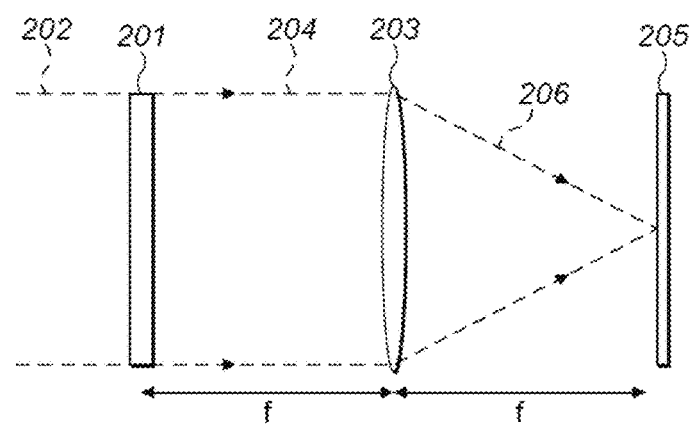
FIG. 2 shows the established layout of a classical Optical Fourier Transform (OFT) stage.

FIG. 2 shows the established layout of a classical Optical Fourier Transform (OFT) stage. An SLM 201, a positive converging lens 203 and a camera sensor 205 are arranged sequentially along a common optical axis. The SLM 201 is arranged to receive coherent, collimated light 202 from a light source such as a laser (not shown). The lens 203 is positioned at a distance f along the common optical axis from the SLM 201 and is arranged to receive spatially modulated light 204 from the SLM. The camera sensor 205 is positioned at a distance f along the common optical axis from the lens 203 and is arranged to receive converging light 206 from the lens 203.

In operation, the SLM 201 "displays" a numerical function g(x,y) driven by a computer, which modulates coherent, collimated light 202 of wavelength λ (for example 635 nm, 2 mW power), effectively converting the numerical function g(x,y) represented in the SLM 201 into the optical domain. The modulated light 204 is then received by the positive converging lens 203, which has a focal length f. This results in a Fourier transform G(u,v) of the numerical function g(x,y) forming at the rear focal plane of the positive converging lens 203. The camera sensor 205 is positioned at the rear focal plane of the positive converging lens to capture the intensity distribution of the converging light 206. Note that x and y are the space co-ordinates, u and v are the spatial frequency co-ordinates. The SLM 201 is of the transmissive type, where the light passes through the device, but note reflective SLM types are equally applicable. Reflective SLMs have a mirror incorporated behind the liquid crystal layer that reflects the light back through the liquid crystal and electrode layers.

The relationship between the distribution forming at the camera sensor 205 and the input function entered via the SLM 201 is that of the two-dimensional Optical Fourier Transform (OFT):

$$G(u,v)=FT[g(x,y)]=\iint g(x,y)\exp[-i2\pi(ux+vy)]dxdy \quad (1)$$

Figure 3:
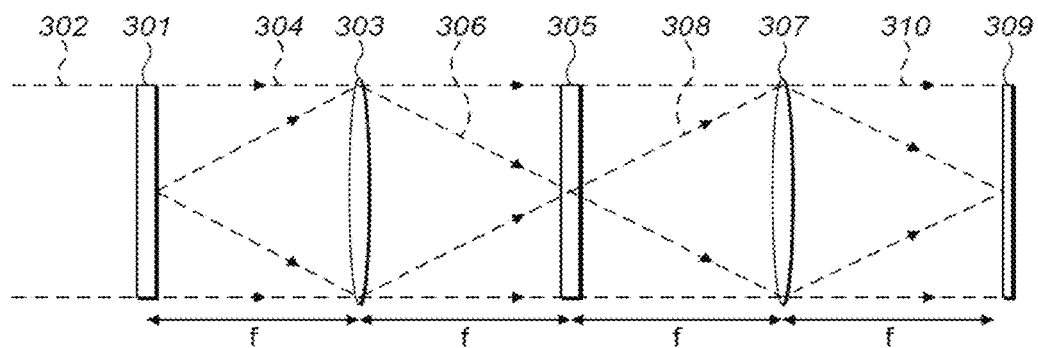
FIG. 3 shows a system incorporating a second OFT stage to create a classical 4-f system.

By extending the system of FIG. 2 to incorporate a second OFT stage, a classical 4-f system may be produced. An example of a classical 4-f system is illustrated in FIG. 3, which shows a first SLM 301, a first lens 303, a second SLM 305, a second lens 307 and a sensor 309 arranged sequentially along a common optical axis. The first SLM 301 is arranged to receive coherent, collimated light 302 from a light source (not shown). The first lens 303 is positioned at a distance f along the common optical axis from the first SLM 301 and is arranged to receive spatially modulated light 304 from the first SLM 301. The second SLM 305 is positioned at a distance f along the common optical axis from the first lens 303 and is arranged to receive modulated converging light 306 from the first lens 303. The second lens 307 is positioned at a distance f along the common optical axis from the second SLM 305 and is arranged to receive filtered light 308 from the second SLM 305. The sensor 309 is positioned at a distance f along the common optical axis from the second lens 307 and is arranged to receive filtered collimated light 310 from the second lens 307.

In operation, an input image or pattern displayed on the first SLM 301 modulates coherent, collimated light 302 of wavelength λ to produce modulated light 304. The modulated light 304 is optically Fourier transformed by a first lens 303 to produce modulated converging light 306 at the rear focal plane of the first lens 303. The resulting complex distribution is optically multiplied with a filter pattern displayed on the second SLM 305, with the resulting distribution being inverse Fourier transformed by the second lens 307 to produce filtered collimated light 310. The result is captured by the sensor 309. This architecture is used for a range of purposes including matched filter optical correlation.

The correlation function between input function g(x,y) and reference function r(x,y) is shown in equation 2, with the respective Fourier transforms being denoted in upper case and the symbol "*" denotes the complex conjugate:

$$r(x,y)*g(x,y)=FT[R(u,v)*G(u,v)] \quad (2)$$

The same 4-f architecture may be used to perform other functions, one of which is the optical derivative function defined below, where $g'^{(n)}(x,y)$ is the n-th order derivative of the function g(x,y):

$$g'^{(n)}(x,y)=FT[(i2\pi uv)^n G(u,v)] \quad (3)$$

Figure 4:
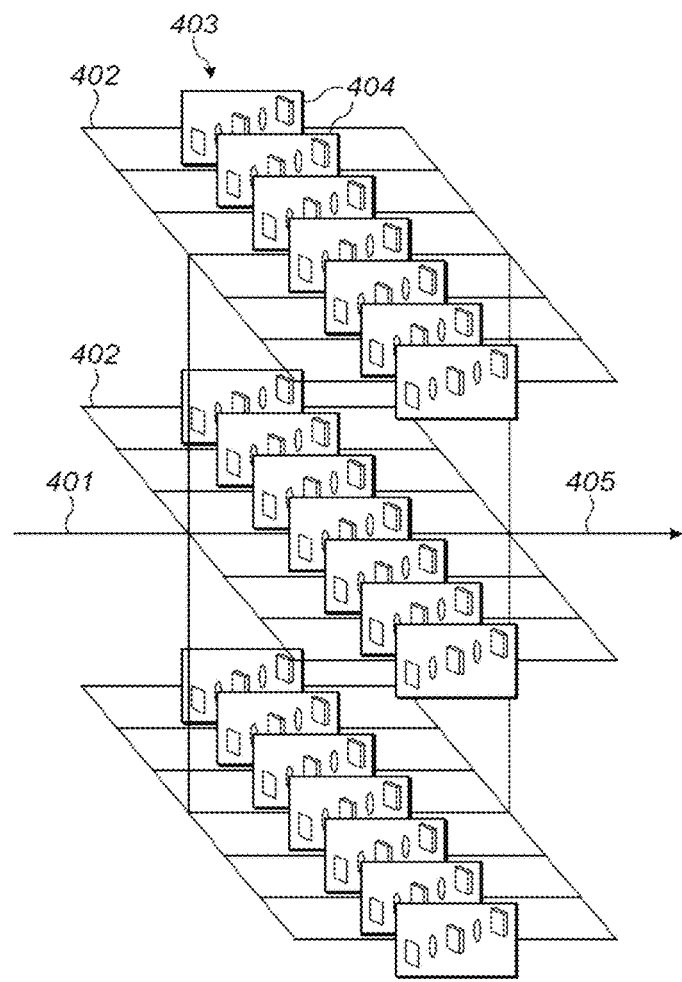
FIG. 4 shows a partial differential equation solver created by combining multiple optical stages.

By combining multiple stages, larger mathematical processes may be formulated optically, such as in a partial differential equation solver. An example of such an arrangement can be seen in FIG. 4. FIG. 4 shows a 2-dimensional array 403 of optical stages 404 each comprising the configuration of FIG. 3. The optical axes of the optical stages 404 are arranged in parallel and the 2-dimensional array extends in a plane which lies perpendicular to the optical axes of the optical stages 404.

In operation, a laser source 401 is split to progress through multiple separate paths 402, each of which lies along an optical axis of an optical stage 404, before being recombined 405. The numerical results of the individual optical stages 404 are optically summed at a camera sensor (not shown). With such a system the equivalent electronic processing rates achievable are well in excess of what traditional computing methods can provide, at a fraction of the power consumption and without the data management issues that are associated with electronic multi-core processing.

Figure 5:
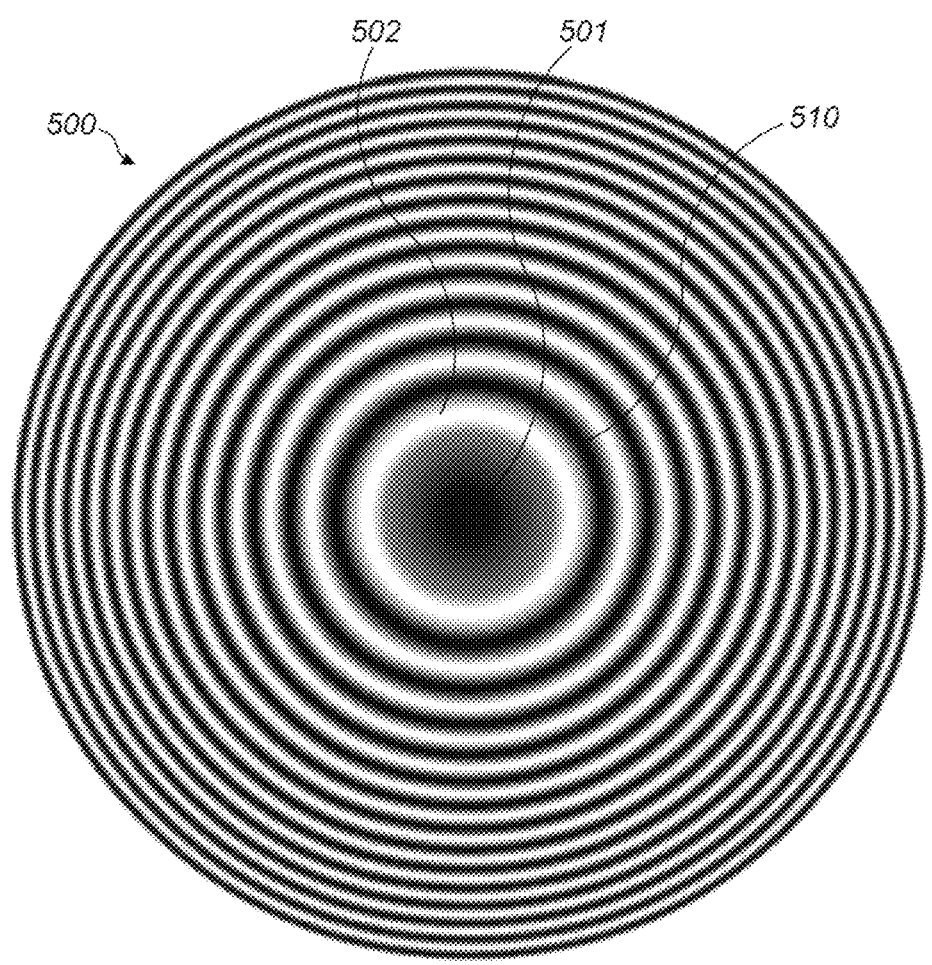
FIG. 5 shows a zone plate diffraction grating.

A major limitation in producing such a large optical system is in how to align the multitude of components to a high degree of accuracy for each of the axes shown in FIG. 1. This is particularly important for the matrix multiplication stage in the centre of each of the 4-f stages described above, where each of the spatial frequency pixels which form optically at the filter SLM that needs to be incident on the respective pixels on the filter SLM. This was partially resolved in patent application PCT/GB2013/051778 where the lenses were removed and replaced with zone plate diffraction grating patterns and phase ramps to focus and steer the laser beam dynamically. FIG. 5 shows an example of a sinusoidal zone plate diffraction grating pattern 500. A circular dark region 501 is surrounded by alternating concentric light 502 and dark regions 510 to form a radially symmetric pattern. This use of zone plates and phase ramps provides an optical system which comprises predominantly of liquid crystal panels, ending with a camera sensor, as shown in FIG. 6.

Figure 6:
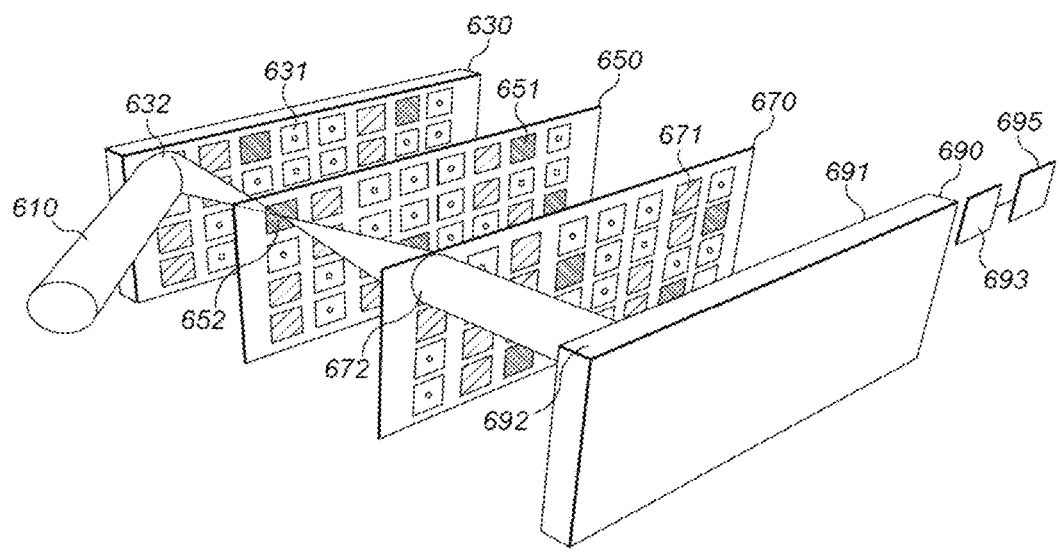
FIG. 6 shows an optical system including predominantly of liquid crystal planes, ending with a camera sensor.

FIG. 6 shows a first liquid crystal panel 630, a second liquid crystal panel 650, a third liquid crystal panel 670 and a fourth liquid crystal panel 690, which are arranged parallel to each other and offset in a direction perpendicular to the planes of the panels, separated by a distance equivalent to f of FIG. 3. The first and fourth liquid crystal panels 630, 690 comprise 2-dimensional arrays of optical patterns 631, 691 arranged to reflect incident light, and the second and third liquid crystal panels 650, 670 each comprise a 2-dimensional array of optical patterns 651, 671 arranged to transmit incident light. A camera sensor 693 is positioned to capture the eventual result.

In operation, coherent, collimated laser light 610 reflects from a first addressed optical pattern 632 of the first liquid crystal panel 630 and is modulated by the same. The modulated light is further modulated by second, third and fourth optical patterns 652, 672, 692 of the second, third and fourth liquid crystal panels 650, 670, 690 respectively, before being received by the camera sensor 693. The camera sensor 693 is generally coupled to a digital computer 695 that implements the functional blocks for realizing the disclosed calculations which can be executed in software by the digital computer's processor, or can be implemented by equivalent digital logic circuits. The processor can comprise a microprocessor, digital signal processor (DSP), or a microcontroller unit (MCU).

The architecture in FIG. 6 lends itself to a reconfigurable and dynamic optical system using Fresnel zone plates/lens patterns (or other such diffractive lens patterns) and phase ramps for alignment. The components and path are defined by the placement and type of patterns addressed to the opposing liquid crystal panels. However, for the concept to be able to offer processing rates beyond those of traditional electronic techniques, the SLM panels should have extremely high pixel counts. Extremely high pixel count displays (for example, 100,000×100,000 pixels) would come with very high unit costs due to custom manufacturing being required and will likely have low yield rates due to their size.

Figure 7:
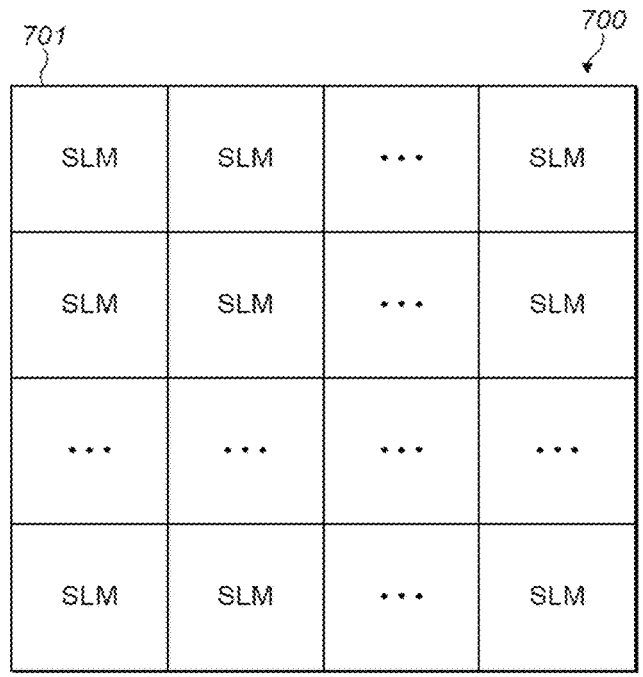
FIG. 7 shows a tiled array of SLMs.

Owing to these problems, one may combine a plurality of diffractive elements by, for example, tiling as shown in FIG. 7. FIG. 7 shows a tiled rectangular array 700 of individual SLMs 701 arranged in a single plane. Tiling smaller SLMs together to achieve the same effective resolution as the larger panels is an attractive alternative, but the inventors have recognised that this increases the complexity in initial hardware alignment.

The present disclosure relates to addressing the alignment problem which arises when pluralities of individual diffractive elements are optically combined. If a plurality of individual diffractive elements are optically coupled, it is necessary to consider six axes of freedom x,y,z,r,p,w defined previously in FIG. 1. The problem is not therefore trivial.

Disclosed embodiments include addressing the angular translational (rotational) axes r,p,w.

The inventors have recognised that by examining the far field (Fraunhofer) diffraction pattern (which is equivalent to the Fourier transform) of diffractive elements, a measure of relative alignment for the rotational axes r,p,w may be derived. In an embodiment, the diffractive elements, such as patterned grids or 2D arrays of elements, are illuminated with coherent light and the far field diffraction pattern created is used to determine the relative alignment of the diffractive elements. In particular, features of the far field diffraction patterns are compared in order to determine the relative rotational or translational alignment of the diffractive elements.

Figure 8A:
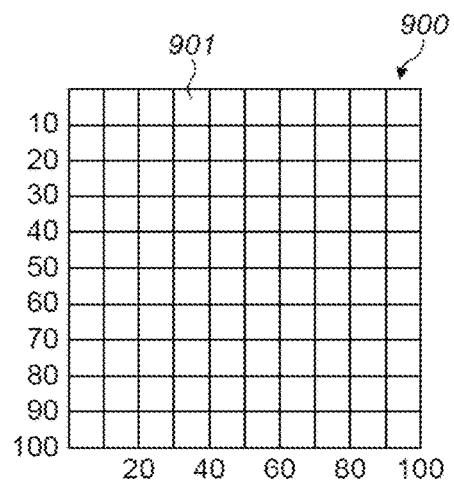
FIG. 8a shows a pixelated grid and its theoretical diffraction pattern.

FIG. 8a shows an embodiment in which each diffractive element is a grid 900 comprising a 2-dimensional rectangular array of square apertures 901.

Figure 8B:
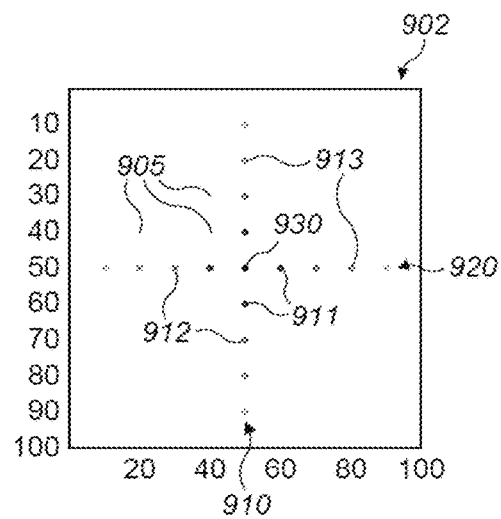
FIG. 8b shows a diffraction pattern created by the pixel structure of an SLM.

FIG. 8b shows the intensity of the far-field diffraction pattern (i.e. the equivalent Fourier transform distribution) 902 created by illuminating the grid 900 of FIG. 8a. The far-field diffraction pattern 902 comprises a plurality of maxima 905 arranged in a regular rectangular array. The maxima 905 comprise square-shaped dots of varying intensity and the maxima have dimensions of around 1/10 the spacing between adjacent maxima. A vertical line array of maxima 910 and a horizontal line array of maxima 920 comprise the highest intensity maxima. The vertical line array of maxima 910 is arranged along a vertical centreline of the far-field diffraction pattern 902 and the horizontal line array of maxima 920 is arranged along a horizontal centreline of the far-field diffraction pattern 902. The vertical line array of maxima 910 and the horizontal line array of maxima 920 bisect at right angles. A zero order maxima 930 comprising the highest intensity maxima of the far-field diffraction pattern 902 is formed at the point of intersection of the vertical line array of maxima 910 and the horizontal line array of maxima 920. First order maxima 911 are found either side of the zero order maxima on the vertical line array of maxima 910 and on the horizontal line array of maxima 920. Higher order maxima can be found further from the zero order maxima along the vertical line array of maxima 910 and the horizontal line array of maxima 920, for example second order maxima 912 and third order maxima 913 are found adjacent the first order maxima 911.

Figure 8C:
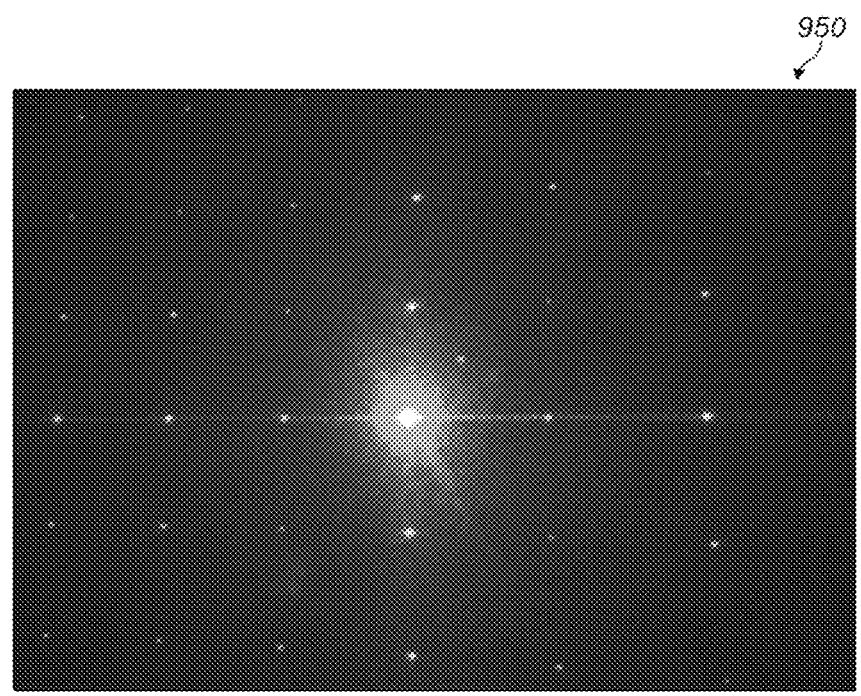

FIG. 8c shows a scanned photograph 950 of a far-field diffraction pattern of the type shown in FIG. 8b produced by an SLM possessing the structure of FIG. 8a. Although FIG. 8a shows a grid of periodic square apertures, it may be understood that any diffractive element may be used to produce a diffraction pattern. For example, the diffractive element may be a grid of periodic hexagonal apertures or a complex irregular non-binary array. The basis of far-field diffraction can be explained with reference to FIG. 9.

Figure 9:
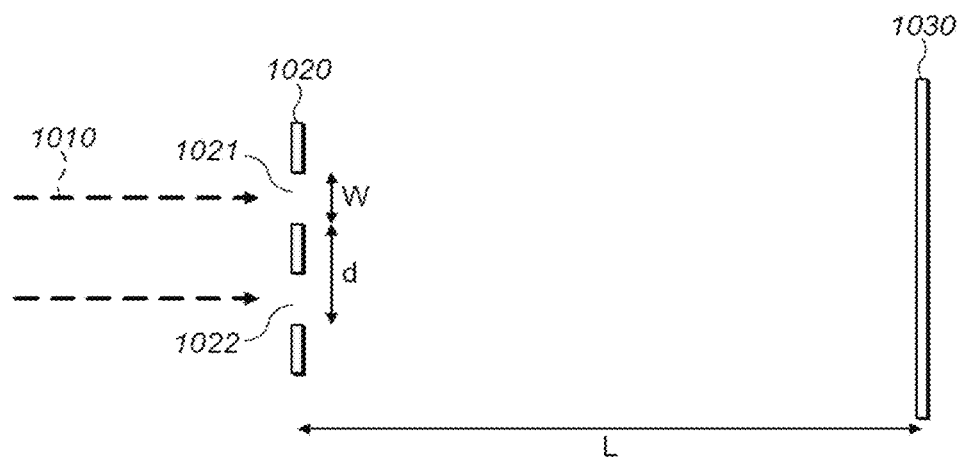
FIG. 9 shows a double-slit arrangement for creating a diffraction pattern.

FIG. 9 shows a dual aperture screen 1020 comprising a first aperture 1021 of width W and a second aperture 1022 also of width W positioned a distance d from the first aperture. An observation screen 1030 is positioned parallel to the dual aperture screen 1020 at a distance L from the dual aperture screen 1020.

In operation, collimated, coherent light 1010 having a wavelength, A, is incident normal to the dual aperture screen 1020 whereupon the light is diffracted by the first and second apertures 1021, 1022. Diffracted light from the first aperture 1021 interferes with diffracted light from the second aperture 1022 to form a diffraction pattern at the observation screen 1030. The far field region as described above is considered to be an area beyond which the following criterion is met:

$$W^2/L\lambda \ll 1 \quad (4)$$

The far field diffraction pattern produced from a grid typically contains bright and dark interference regions, which successive maxima spaced equally apart at an angular separation (in the one-dimensional case):

$$d \sin \theta_m = m\lambda \quad (5)$$

where d=the aperture spacing, θ=diffraction angle, m=integer order, and λ—wavelength of the light.

When illuminated with coherent light, a grid comprising rectangular or square pixels forms a diffraction pattern with bright spots which occur along first and second lines of the diffraction pattern. A "zero order" component spot of un-diffracted light is positioned at the intersection of the first and second line.

If a solid block, is held parallel with a base (for example on an optical table), orientation of the diffraction pattern created by a first SLM attached to the block provides an instant measure of how the first SLM is located or aligned relative to the solid block, in terms of the rotation axes, r, p, w.

Figure 10:
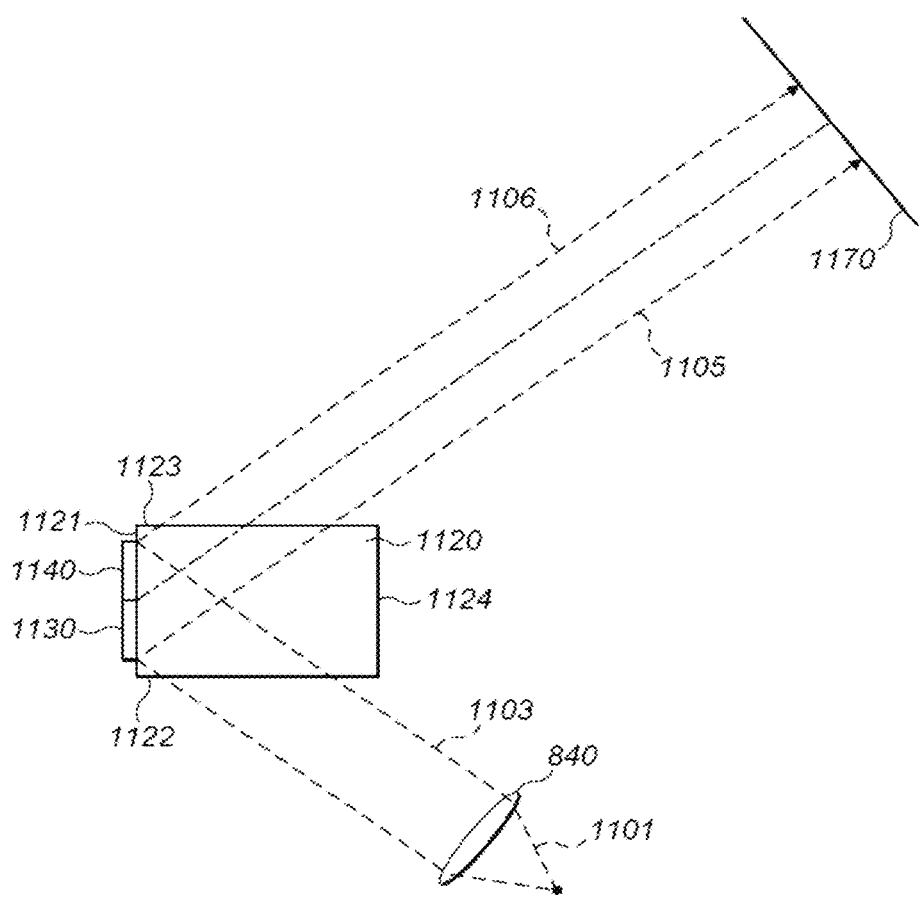
FIG. 10 shows an optical apparatus for assessing the relative alignment of the rotational axes of diffractive elements.

FIG. 10 shows an embodiment of the present disclosure comprising two SLMs. A support medium 1120 comprises a first face 1121, a second face 1122 adjacent and orthogonal to the first face 1121, a third face 1123 opposite and parallel to the second face 1122 and a fourth face 1124 opposite and parallel to the first face 1121. A first reflective SLM 1130 and a second reflective SLM 1140 adjacent to the first reflective SLM 1130 are bonded to the first face 1121 and arranged to face the interior of the support medium 1120. That is, the first reflective SLM 1130 and second reflective SLM 1140 are arranged to receive, and spatially modulate, light received from inside support medium 1120. In other words, the optical input parts of the first reflective SLM 1130 and second reflective SLM 1140 are directed into the support medium 1120.

In operation, the first reflective SLM 1130 and second reflective SLM 1140 are illuminated by collimated light 1103 from a source 1101 through the second face 1122. A first portion of the received light is diffracted by the first reflective SLM 1130 and a second portion of the received light is diffracted by the second reflective SLM 1140 to create a first diffracted beam 1105 and a second diffracted beam 1106, respectively which propagate out of the support medium 1120 through the third face 1123 to a screen 1170. A far field diffraction pattern is formed on the screen 1170 by the first and second diffracted beams 1105, 1106.

Although FIG. 10 shows the collimated light 1103 propagating to the SLMs through the second face 1122, it may be understood that the collimated light may propagate along any path into the support medium so long as the collimated light illuminates both SLMs. For example, the collimated light may propagate through a top surface or from other directions if, for example, a mirror coating is placed on a fourth face 1124 of the support medium 1120.

In embodiments, the source 1101 is a laser and the collimated light 1103 is therefore laser light, but it may be understood that any coherent light is suitable. For example, in other embodiments, other light sources may be used in conjunction with a pin-hole aperture to form collimated light 1103.

Although FIG. 10 shows that the first reflective SLM 1130 and second reflective SLM 1140 are bonded to the support medium 1120, and arranged to face the interior of the support medium it may be understood that they may be bonded or mounted in other ways. For example, in other embodiments, the first reflective SLM 1130 and second reflective SLM 1140 may be mounted such that their optical input ports face outwards from the support medium 1120. That is, in embodiments, the first reflective SLM 1130 and second reflective SLM 1140 are arranged to receive and spatially modulate light received from outside the support medium 1120.

Although FIG. 10 shows a first reflective SLM 1130 and a second reflective SLM 1140, it may be understood that any diffractive element may be used. In other embodiments, the diffractive elements are charge coupled devices, diffractive optical elements, complementary metal-oxide-semiconductors, micro-electro-mechanical devices, or liquid crystal on silicon devices. However, it may be understood from the following that any elements which produce radially asymmetrical diffraction patterns are equally suitable.

Although FIG. 10 shows a screen 1170, it may be understood that other means of receiving the diffracted beams 1105, 1106 are also suitable. For example, in other embodiments, a camera may be used in place of the screen 1170.

Optionally, in embodiments, a positive lens is inserted in the path between the SLMs 1130, 1140 and the screen 1170 (at a distance f from the SLMs and screen) to produce the Fourier transform in the rear focal plane of the positive lens, in order to reduce the distance required between the SLMs and screen.

The pixelated grids of SLMs are typically, but not always, square in shape and periodic across the active area of the device. Each pixel may be considered as an aperture. The first reflective SLM 1130 and second reflective SLM 1140 effectively function as a single combined grid. Therefore the respective diffraction patterns on the screen represent the relative alignment of the first reflective SLM 1130 and second reflective SLM 1140.

Figure 11:
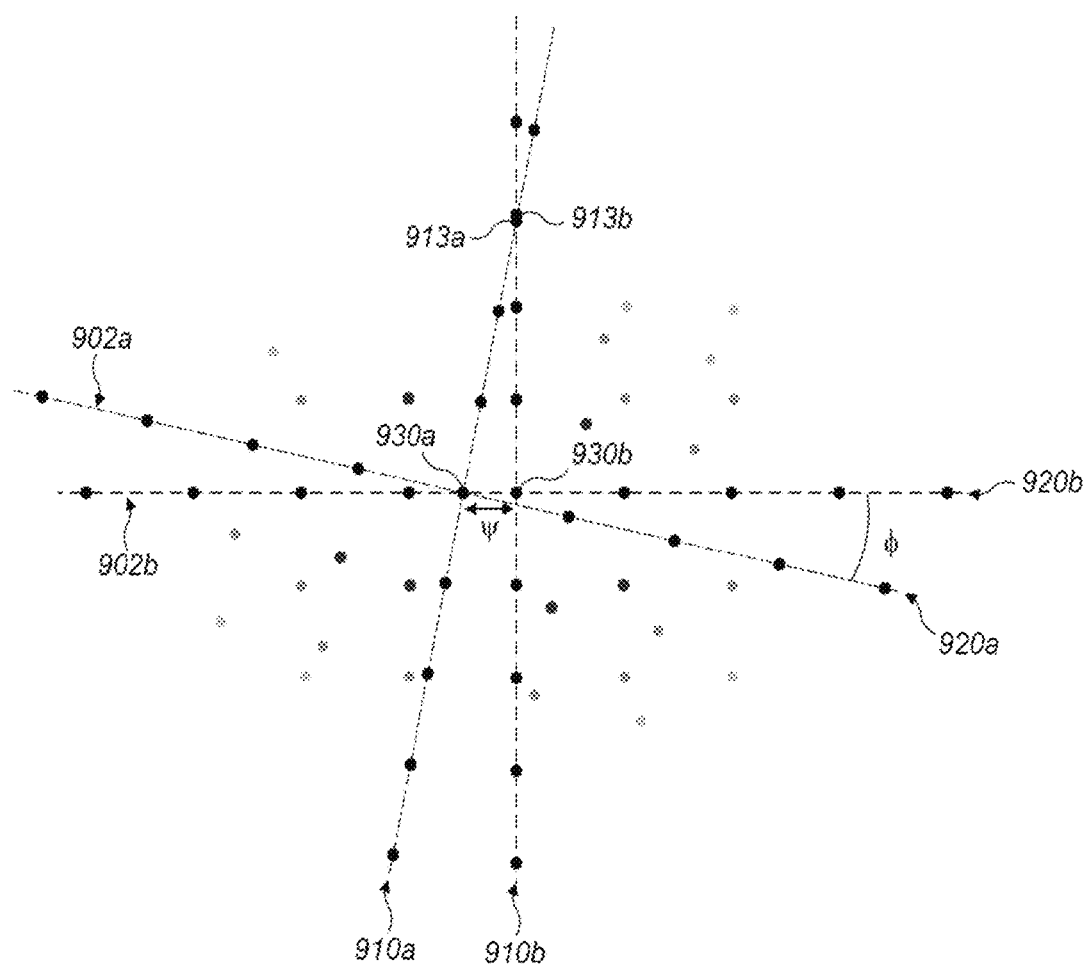
FIG. 11 shows the relative alignment of two diffraction patterns wherein the central maxima are misaligned.

FIG. 11 shows an example of two overlapping far field diffraction patterns. A first far field diffraction pattern 902a resulting from the first reflective SLM 1130 partially overlaps with a second far field diffraction pattern 902b resulting from second reflective SLM 1140. There is a horizontal distance $\Psi$ between the first zero order maxima 930a of the first diffraction pattern 902a and the second zero order maxima 930b of the second diffraction pattern 902b. The first diffraction pattern 902a is offset by an angle $\Phi$ relative to the second diffraction pattern 902b. That is, there is an angle $\Phi$ between the first horizontal line array of maxima 920a of the first diffraction pattern 902a and the second horizontal line array of maxima 920b of the second diffraction pattern 902b. It can be seen from FIG. 11 that the devices are aligned along axis p, because, for example, the distance between the third order maximum 913a of the first vertical line array of maxima 910a and the third order maxima 913b of the second vertical line array of maxima 910b is zero. However, it can be seen that there is a mis-alignment in axis w, because the distance $\Psi$ is greater than zero. Furthermore, since the angle $\Phi$ is greater than zero, it can be seen that there is also a mis-alignment in axis r.

The accuracy of the method increases the further the screen 1170 is placed from the support medium 1120. In the case the screen 1170 is positioned L=2m from the SLMs, the two SLMs are 1920×1080 pixels in resolution and have square pixels of d=8 um size, the first reflective SLM 1130 and second reflective SLM 1140 produce an active area for consideration of 15.36 mm horizontal and 6.64 mm vertical. If the images produced on the screen of each SLM are magnified by a factor of 1000, a displacement of 1 um in the x or y axes creates a displacement of 1 mm on the screen, which can easily be detected. Any mis-alignment becomes clear when the higher order terms, for example higher order maxima, in the far field diffraction patterns are examined.

It may therefore be understood that there is provided a method for assessing the relative alignment of the first and second diffractive surface, the method comprising: illuminating the first diffractive element to form a first diffraction pattern in the far field; illuminating the second diffractive element to form a second diffraction pattern in the far field; and determining a positional and/or rotational relationship between the first diffraction pattern and the second diffraction pattern in the far field.

This provides a non-contact method for assessing the alignment of diffractive elements. The use of diffraction patterns for assessing the alignment of the diffractive elements provides benefits over other alignment methods using light: diffraction patterns often display high resolution features when viewed in the far field, allowing for greater precision in alignment assessment tasks. In addition, the method is also scalable, allowing assessment of the relative alignment of sub-systems of aligned elements to form larger systems. Notably, even though the first and second diffractive surfaces may be offset in space, the property of Fraunhofer diffraction is such that their far field diffraction patterns are spatially collocated with a phase offset when they are correctly aligned.

Figure 12:
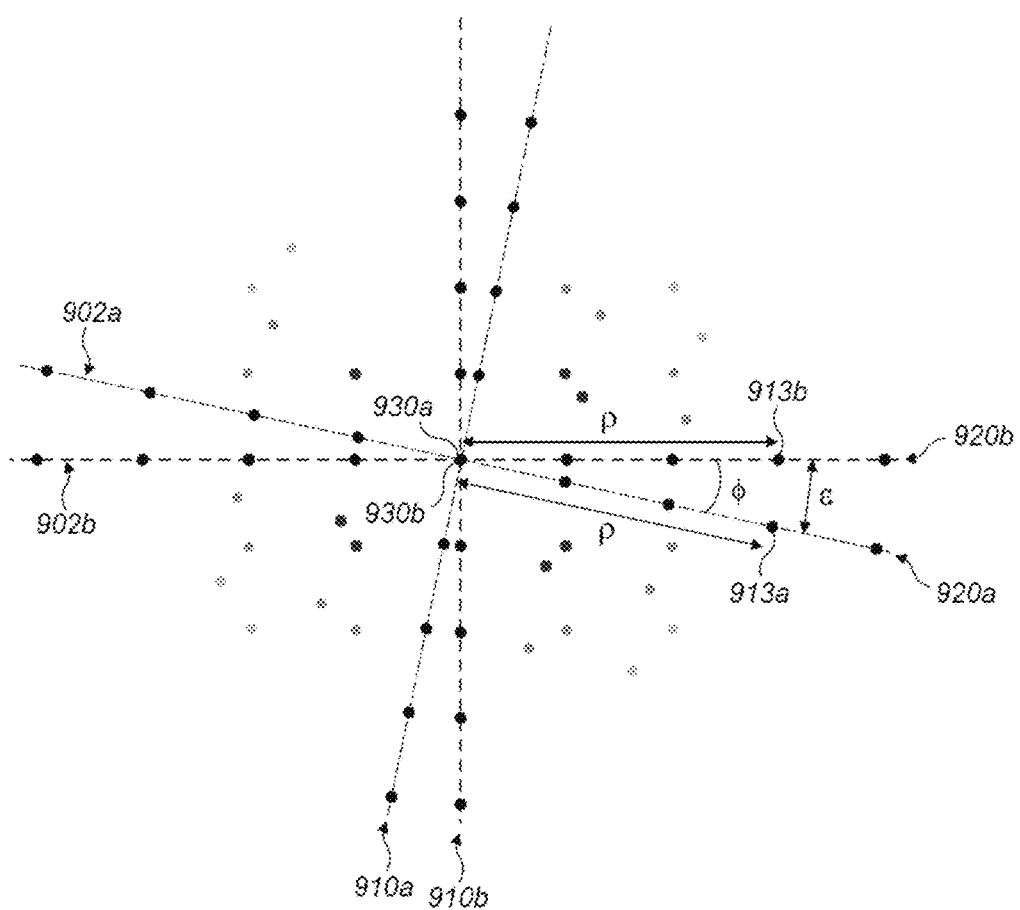
FIG. 12 shows the relative alignment of two diffraction patterns wherein the central maxima are aligned.
Figure 13:
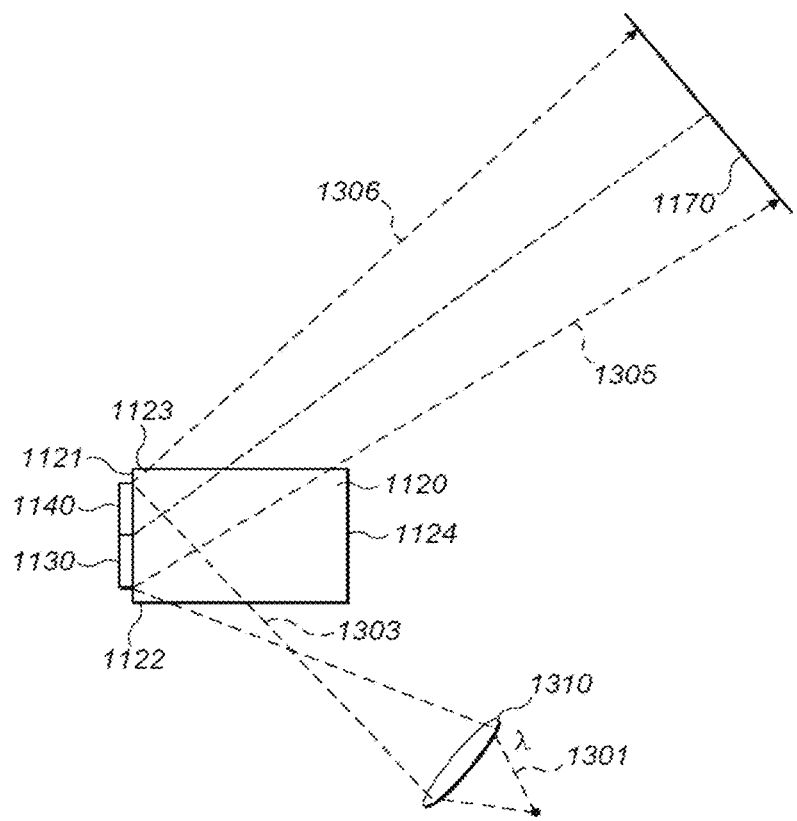
FIG. 13 shows an optical apparatus for aligning the translational axes of diffractive elements.

FIG. 12 shows the first diffraction pattern 902a and second diffraction pattern 902b of FIG. 11. However, in contrast with FIG. 11, the distance Ψ is zero. That is, the first zero order maxima 930a and the second zero order maxima 930b are aligned. In addition, the angle Φ in FIG. 13 is greater than zero and therefore the first diffraction pattern 902a is rotated with respect to the second diffraction pattern 902b by a small angle Φ.

If the example of FIG. 12 is taken where a first reflective SLM 1130 and second reflective SLM 1140 have a misalignment in r of =1 degree, this will result in a distance ε between the third order maxima 913a of the first horizontal line array of maxima 920a and the third order maxima 913b of the second horizontal line array of maxima 920b. A wavelength λ=532 nm is used in the example. The distance from the third order maxima 913a to the zero order maxima 930a is denoted ρ, which can be calculated from:

$$\rho = L \tan \theta_m \quad (6)$$

The separation distance, ε, may be calculated from the relationship:

$$\varepsilon = 2\rho \sin(\Phi/2) \quad (7)$$

Combining equations (6) and (7) gives:

$$\varepsilon = 2L \tan(\theta_m)\sin(\Phi/2) \quad (8)$$

Finally combining equations (7) and (8) and solving for ε thus gives:

$$\varepsilon = 2L \tan(\sin^{-1}(m\lambda/d))\sin(\Phi/2) \quad (9)$$

Using equation (8) with the example thus produces a 7 mm separation between the third order spots, for a 1 degree misalignment. This can generally easily be detected. It may therefore be appreciated that there is provided herein a method of detecting small misalignments with a high degree of accuracy.

The inventors have recognised that features of the first diffraction pattern and the second diffraction pattern provide useful reference points for determining a positional and/or rotational relationship between the first diffractive element and the second diffractive element.

Therefore, in embodiments, the positional relationship between the first diffraction pattern and the second is diffraction pattern in the far field is determined by determining a positional relationship between a first feature of the first diffraction pattern and a second feature of the second diffraction pattern.

Advantageously, by using the positional relationship between a first feature of the first diffraction pattern and a second feature of the second diffraction pattern, a more easily identifiable positional relationship between the first diffraction pattern and the second diffraction pattern can be determined. Accordingly, an improved method of determining the alignment of the two diffractive elements is provided.

The inventors have recognised that, in the far field, maxima and minima provide accurate reference points for determining a positional and/or rotational relationship between the first diffractive element and the second diffractive element.

Therefore, in embodiments, the first feature is a maxima or minima of the first diffraction pattern and the second feature is a maxima or minima of the second diffraction pattern. Optionally, the first feature is the nth-order maxima of the first diffraction pattern and the second feature is the nth-order maxima of the second diffraction pattern. Optionally, the first feature is the zero-order maxima of the first diffraction pattern and the second feature is the zero-order maxima of the second diffraction pattern.

Advantageously, using maxima or minima of the first diffraction pattern and second diffraction pattern provides a more precise method of assessing the relative alignment of the first diffractive element and the second diffractive element.

Diffraction patterns similar to the zone plate diffraction grating pattern of FIG. 5 may be used to determine the rotational alignment for the first diffractive element and second diffractive service in up to two rotational axes. The relative alignment of the first and second diffractive element in the pitch and yaw axes p and w determines the relative translational alignment of the first and second diffractive patterns in the x and y axes on the screen. However, in embodiments, the first diffraction pattern and the second diffraction pattern are radially asymmetric diffraction patterns because the inventors have recognised that alignment of the first and second diffractive element in the rotational axis r may also be assessed if the first and second diffraction patterns are rotationally a symmetric.

Therefore, in embodiments, the first diffraction pattern and the second diffraction pattern are radially asymmetric diffraction patterns.

In embodiments, the first diffractive element is a 2D array of elements or grid and/or the second diffractive element is a 2D array of elements or grid. Advantageously, a 2D array of elements or grid creates a rotationally symmetric diffraction pattern with well-defined and easily identifiable features in the far field.

In the case of a misaligned first reflective SLM 1130 and second reflective SLM 1140, a correct alignment can be achieved by rotating one of the SLMs with respect to the other. For example, by applying pressure to the back of the SLMs with a suitable fine adjust mounting mechanism, the rotations along the axes p and w can be adjusted. Angular differences between the SLMs along axes p and w will be shown on the screen as linear displacements in the diffraction patterns—highlighted by examining the higher order spots away from the central (zero order) maxima.

There is provided an improved method for performing an alignment of a first diffractive element with a second diffractive element. For example, in embodiments of the present disclosure the first diffractive element is rotated with respect to the second diffractive element based on the determined positional and/or rotational relationship. Optionally, the method further comprises rotating the first diffractive element with respect to the second diffractive element until the positional and/or rotational relationship between the first diffraction pattern and second diffraction pattern is a predetermined positional and/or rotational relationship.

By adjusting the first reflective SLM 1130 and/or second reflective SLM 1140 so that the first diffraction pattern 902a and second diffraction pattern 902b overlap entirely, alignment along the three rotational axes r,p,w, may be achieved. Optionally, the first diffractive element is rotated with respect to the second diffractive element until the first diffraction pattern substantially overlaps with the second diffraction pattern.

In embodiments, aspects of the present disclosure may be repeated after rotating the first diffractive element with respect to the second diffractive element. Advantageously, an observation can be made as to the effect of rotating the first diffractive element with respect to the second diffractive element on the positional and/or rotational relationship between the first diffraction pattern and second diffraction pattern. By this observation, a correlation between a degree of rotation of the first diffractive element with respect to the second diffractive element and the positional and/or rotational relationship between the first diffraction pattern and second diffraction pattern can be determined. Accordingly, any further adjustment of the relative alignment of the first and second diffractive elements can be performed more easily, with greater certainty and/or with fewer adjustment steps.

In further embodiments, there is provided a method for assessing a relative translational alignment between a first diffractive element and a second diffractive element. Embodiments consider the linear alignment of the first reflective SLM 1130 and second reflective SLM 1140 along the x and y axes (wherein the z-axis is the optical axis). In an embodiment, diverging light is incident on the SLMs and the images of the SLMs, rather than the Far Field diffraction patterns, are formed on a screen. Through the projection of these images, any small differences in alignment along the x and y axes are magnified and become apparent upon inspection. Through fine adjustment, these differences may be corrected for by linear translation of the SLMs—optionally using a suitable mount to hold the devices in place.

In another aspect of the present disclosure, there is therefore provided a method for assessing the relative alignment of a first and second diffractive element, the method comprising: illuminating the first diffractive element to form a first image of the first diffractive element in the far field; illuminating the second diffractive element to form a second image of the second diffractive element in the far field; and determining a positional relationship between the first image and the second image in the far field.

Advantageously, there is provided a non-contact method for determining a relative translational alignment of a first diffractive element and a second diffractive element. The inventors have recognised that an improved method may be performed by providing magnified versions of the first image and second image. FIG. 13 shows the layout of this arrangement.

In operation, a lens 1310 that receives coherent light 1301 at wavelength λ is used to create a diverging beam 1303 which propagates through the second face 1122 and is reflected by the first reflective SLM 1130 and second reflective SLM 1140 to create reflected beams 1305, 1306. Images of the two SLMs are magnified (because the light is diverging) and projected onto a screen 1170.

Therefore, in embodiments, the steps of illuminating comprise illuminating the first and second diffractive elements with diverging light. However, in another embodiment, images of the two SLMs are magnified by other means. The first and second SLMs 1130, 1140 are illuminated instead by collimated light. In this embodiment, collimated light reflected from the first and second SLMs 1130, 1104 is projected through the third face 1123 and through a diverging lens positioned between the support medium 1120 and screen 1170. In this way, magnified images of the first and second SLM 1030, 1040 are projected onto the screen 1170.

Advantageously, by magnifying the first image and the second image, determining a positional relationship between the first image and the second image in the far field can be achieved with greater accuracy.

Therefore, in other embodiments, the steps of illuminating comprise illuminating the first and second diffractive elements with substantially collimated light, optionally, incoherent light.

Figure 14:
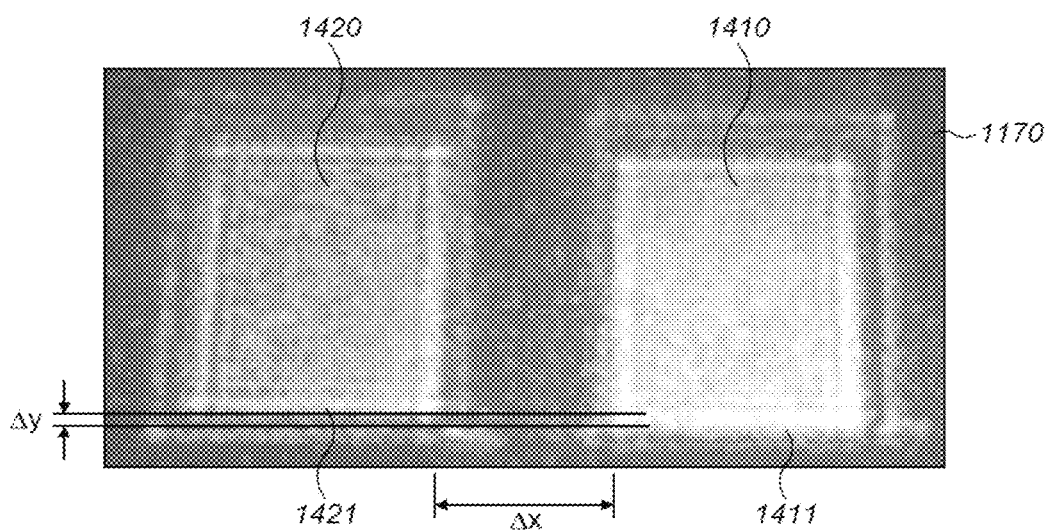
FIG. 14 shows the magnified projected images of two SLMs.

FIG. 14 shows an example image on the screen 1170 of FIG. 13 displaying a first magnified image 1410 of the first reflective SLM 1130 and a second magnified image 1420 of the second reflective SLM 1140 neighbouring the first magnified image 1410. The first magnified image 1410 and second magnified image 1420 appear as approximately rectangular shaped bright regions on the screen 1170. A distance Δx is defined as the separation distance between the first magnified image 1410 and second magnified image 1420 in a first direction. Δx can be referenced against the magnification of the known spacing of the SLM devices to calculate any misalignment of the first reflective SLM 1130 and second reflective SLM 1140. A distance Δy is defined as the displacement between the bottom edge 1411 of the first magnified image 1410 and the bottom edge 1421 of the second magnified image 1420 in a second direction, wherein the second direction is orthogonal to the first direction. Δy should be zero for correct alignment of the first reflective SLM 1130 and second reflective SLM 1140.

The inventors have recognised that features of the first image and the second image in the far field provide useful reference points for determining a linear positional relationship between the first diffractive element and the second diffractive element. Therefore, in embodiments, a positional relationship between the first image and second image in the far field is determined by determining a positional relationship between a first feature of the first image and a second feature of the second image.

Advantageously, by using the positional relationship between a first feature of the first image and a second feature of the second image, a more easily identifiable positional relationship between the first diffractive element and the second diffractive element can be determined.

There is provided an improved method for performing an alignment of a first diffractive element with a second diffractive element. For example, in embodiments, the method further comprises translating the first diffractive element with respect to the second diffractive element based on the determined positional relationship. Optionally, the method further comprises translating the first diffractive element with respect to the second diffractive element until the positional relationship between the first image and the second image is a predetermined positional relationship. Optionally the first diffractive element is translated with respect to the second diffractive element until one side of the first image is collinear with the corresponding side of the second image.

In embodiments, aspects of the present disclosure may be repeated after rotating the first diffractive element with respect to the second diffractive element.

Advantageously an observation can be made as to the effect of translating the first diffractive element with respect to the second diffractive element on the positional relationship between the first diffraction pattern and second diffraction pattern. By this observation, a correlation between a determined translation of the first diffractive element with respect to the second diffractive element and the positional relationship between the first diffraction pattern and second diffraction pattern can be determined. Accordingly, any further adjustment of the relative alignment of the first and second diffractive elements can be performed more easily, with greater certainty and/or with fewer adjustment steps.

As previously discussed, in optical systems such as those of FIGS. 2 and 3, it is often important that the diffractive elements be aligned in all six axes of FIG. 1. In an embodiment the "z" axis is set by bonding the diffractive elements to a precision engineered support medium. The usual air gap between the successive SLMs is replaced by the support medium.

In an embodiment, the support medium is a glass or translucent or transparent material of sufficient purity and uniformity and optionally of the same refractive index as the cover glass of the diffractive element and camera components. Examples of suitable materials are fused silica or BK7 glass. In further embodiments, an index matched ultraviolet cured adhesive or other suitable adhesive is used to bond the devices to the support medium.

Figure 15A:
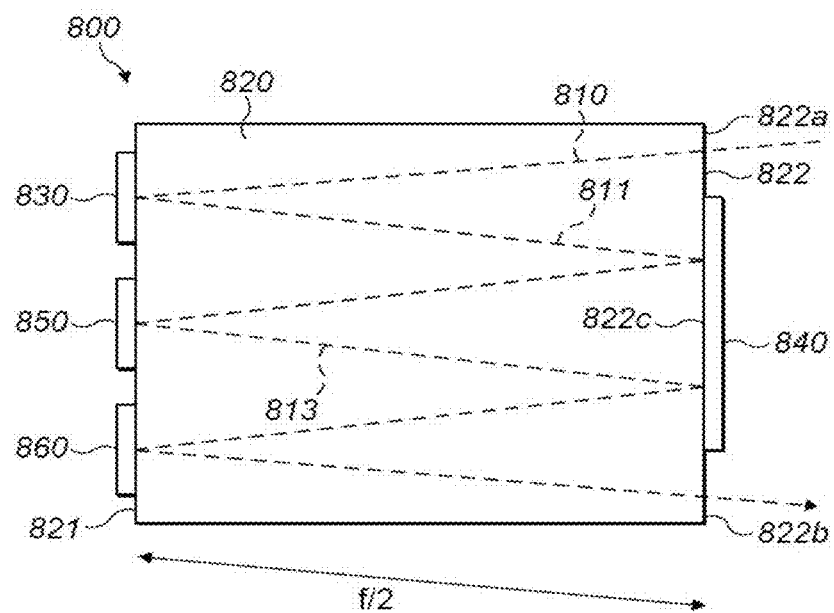
FIG. 15a shows a schematic of a single Fourier transform stage system comprising components bonded to a support medium.
Figure 15B:
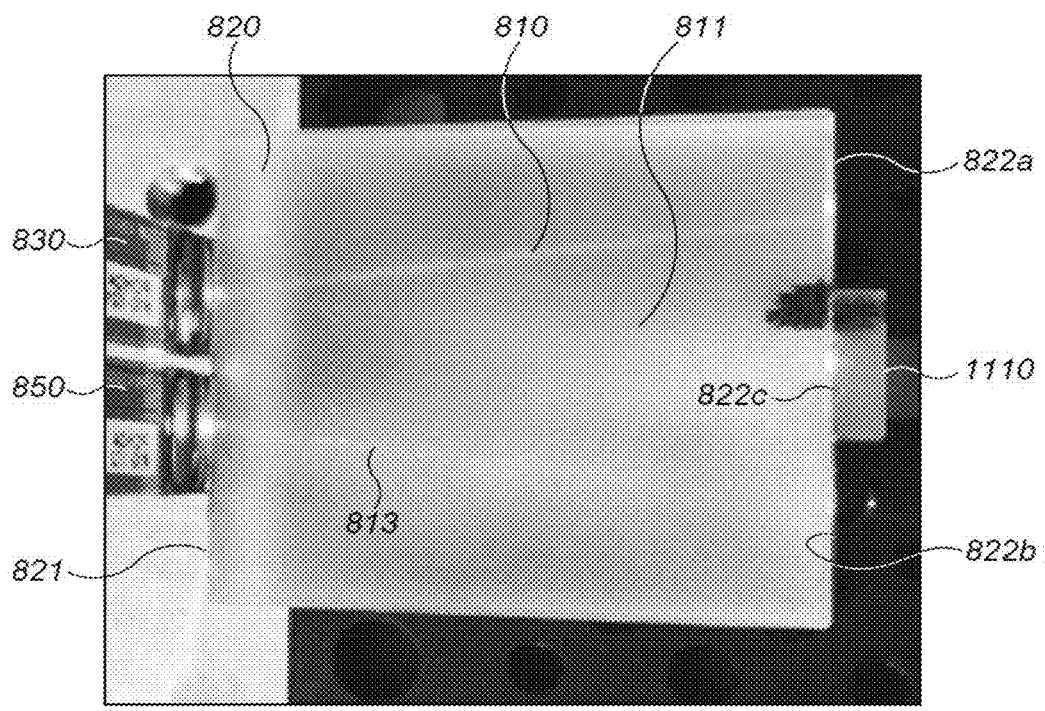
FIG. 15b shows a scanned photograph of a single Fourier transform stage system comprising components bonded to a support medium.

An embodiment is shown in FIGS. 15a and 15b. FIG. 15a shows a single Fourier transform stage system 800 comprising a support medium 820. The support medium 820 is a monolithic block of transparent material. A first reflective SLM 830, a second reflective SLM 850 adjacent the first reflective SLM and a camera sensor 860 adjacent the second reflective SLM are bonded to a first face 821 of the support medium 820 and arranged to "face" the interior of the support medium 820. A reflective surface (e.g., a plane mirror surface) 840 is bonded to a central portion 822c of a second face 822 of the support medium 820 and arranged to face the interior of the support medium 820. An input port 822a of a second face 822 is arranged to receive input light from outside of the support medium 820.

In operation, coherent light 810 enters the support medium 820 through the input port 822a and is reflected and modulated by a first reflective SLM 830 displaying an input function. The modulated light 811 then proceeds to be reflected off reflective surface 840 towards a second reflective SLM 850 which displays a diffractive lens of effective focal length f. Modulated light 811 is then reflected and focussed by the second reflective SLM 850. Focussed light 813, which forms the Fourier transform of the input function, then proceeds to be reflected off the reflective surface 840 to be received at the camera sensor 860. Alternatively the camera sensor 860 may instead be a further SLM displaying a further modulating pattern (such as a filter in a Matched Filter arrangement) and the light exits the block to proceed to a subsequent block for further processing. FIG. 15b shows a scanned photograph of an actual implementation of the Fourier transform stage system 800 as an example without the camera sensor 860 shown in FIG. 15a. FIG. 15b shows the support medium 820, first reflective SLM 830 and second reflective SLM 850 bonded to first face 821 of the support medium 820, reflective surface 840 bonded to a central portion 822c of the second face 822 of the support medium, input port 822a of the second face 822 arranged to receive input light from outside of the support medium, and output port 822b of the second face 822 arranged to transmit output light from inside the support medium. Reference 1110 represents a reflective surface.

Once the first reflective SLM 830 and second reflective SLM 850 have been adjusted and devices are aligned correctly, the adhesive bonding the first reflective SLM 830 and second reflective SLM 850 to the support medium 820 may be cured and correct alignment has been achieved. Further adjustment with a minimum resolution of the SLM pixel sizes and in discrete pixel-sized steps may then be performed in software if required, through adjustment in the placing of the addressed patterns.

Thus, alignment in the z-axis is considered to be solved both for the first reflective SLM 830, the second reflective SLM 850 and the camera sensor 860 of FIG. 15a and for the first reflective SLM 830 and the second reflective SLM 850 of FIG. 15b. By fixing these components to a support medium 820 of constant width and altering the angle of incidence of the modulated light 811 at the first reflection SLM 830, the optical path length between the components can be accurately and stably fixed.

For example, for the Fourier transform relationship between an input SLM and the transforming lens, the focal length for a given wavelength of the lens is determined by the following equation:

$$f = N p_1 p_2 / \lambda \qquad (10)$$

where:
f=focal length of the lens; N=number of pixels used (in an N×N grid); $p_1$=pixel size of the input SLM pixels; $p_2$=pixels size of the camera or filter SLM pixels; $\lambda$=wavelength of the laser light An example of a suitable distance may be for example, N=1000 pixels, $p_1$=8 um, $p_2$=8 um, $\lambda$=635 nm, which leads to a focal length f=100 mm.

In embodiments, there is therefore an additional step further comprising fixing the first and second diffractive element on a common plane. Advantageously, fixing the first and second diffractive element on a common plane allows the spacing of the diffractive elements to be determined with greater certainty. That is, the optical path length between components can be determined with greater accuracy. The method described herein may be employed to align multiple SLMs in a plane, bonded to a support medium. The SLMs may be of different types and may also be replaced with camera sensors or any other fine pixelated grid. For devices of different pixel sizes the spacing of the far field diffraction orders may be pre-calculated for comparison using the equations above.

Figure 16:
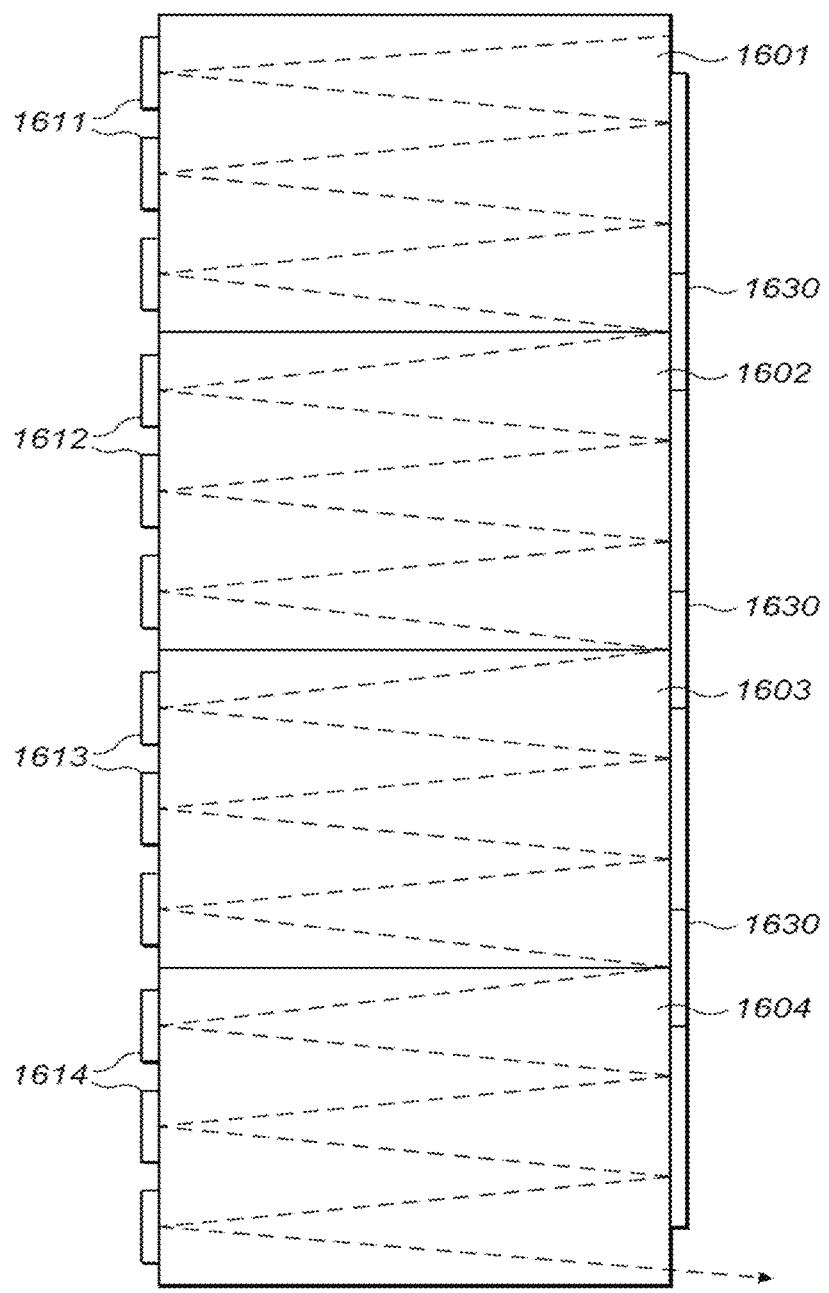
FIG. 16 shows a schematic of multiple Fourier transform stage systems comprising components bonded to support media.

Furthermore, if the devices are bonded to sub-blocks, which are then combined to form a larger optical system, the same method may be applied—this time considering the global axes x',y',z',r',p',w'. FIG. 16 shows an example of this, where a first 3-SLM sub-system 1601 of the type shown in FIG. 15a is aligned relative to identical second 1602, third 1603 and fourth 1604 3-SLM subsystems to create an effective 12-SLM system. The 3-SLM subsystems 1601, 1602, 1603, and 1604 are arranged in a one-dimensional linear array, with additional plane mirror surfaces added so that the exiting light from each block then enters the subsequent block in the path. Reference 1630 represents a reflective surface. The array is arranged such that the SLMs 1611, 1612, 1613, and 1614 are coplanar. This is achieved using the methods described herein for each block, whose SLM components have already been aligned and will therefore produce a single diffraction pattern on the screen. Alignment of the sub-blocks may be achieved as before, first aligning the r',p',w', axes by aligning the diffraction patterns and aligning the x' and y' axes by aligning the image projections.

Although FIG. 16 shows subsystems combined in a one-dimensional linear array, a two-dimensional array or grid of subsystems may be equally applied, as can opposing subsystems.

Figure 17:
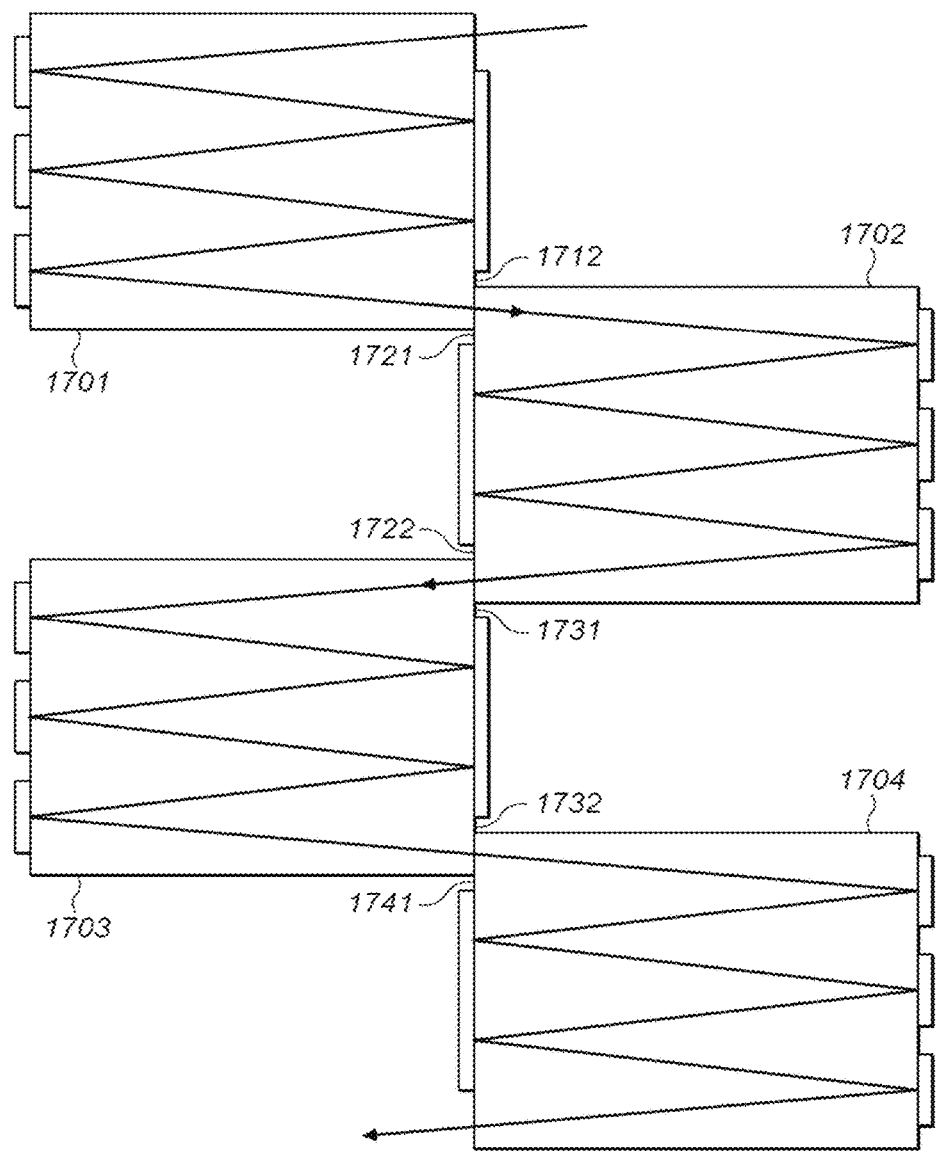
FIG. 17 shows a schematic of multiple opposing Fourier transform stage systems comprising components bonded to support media.

An embodiment comprising opposing subsystems is shown in FIG. 17 where a first 3-SLM sub-system 1701 of the type shown in FIG. 15a is aligned relative to second 1702, third 1703 and fourth 1704 3-SLM subsystems to create an effective 12-SLM system. In this case, the first and third SLM subsystems 1701, 1703 face an opposite direction to the second and third SLM subsystems 1702, 1704. The output port 1712 of the first SLM subsystem 1701 is mated with the input port 1721 of the second SLM subsystem 1702, the output port 1722 of the second SLM subsystem 1702 is mated with the input port 1731 of the third SLM subsystem 1703 and the output port 1732 of the third SLM subsystem is mated with the input port 1741 of the fourth SLM subsystem 1704.

The method described herein may also be employed to test and monitor the alignment of surfaces in other applications. If the surfaces themselves do not exhibit suitable diffraction patterns when illuminated with coherent light, the alignment of the surfaces may be carried out by attaching pixelated SLMs, diffractive elements or other diffraction pattern generating panels to surfaces and illuminating them with coherent light. The diffraction patterns may be used to provide a measure of how the multiple surfaces are aligned. This methods described in the present disclosure may therefore be of benefit in aligning other types of optical system, or testing the alignment of machine components or any other type of surface where a measure of linear or angular displacement is required.

Although diffractive elements are referred to in embodiments, it may be understood that term may include components, objects or surfaces which are not usually referred to as diffractive elements. In this respect, it may be understood that the term 'diffractive element' comprises components which create a diffraction pattern in the far-field when illuminated with coherent light.

By way of example only, in embodiments, the first diffractive element is a spatial light modulator; a charge coupled device; a diffractive optical element; a complementary metal-oxide-semiconductor; a micro-electro-mechanical device; or a liquid crystal on silicon device.

In embodiments, the method further comprises performing optical correlation between an image corresponding to a first diffraction pattern displayed on the first diffractive element and an image (for example, a "filter" image) corresponding to a second diffraction pattern displayed on the second diffractive element. In some embodiments, a method of aligning two spatial light modulators of an optical correlator is provided.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method of assessing a relative alignment of diffractive elements, comprising:
   illuminating a first diffractive element comprising a 2D array of elements or a grid to form a first diffraction pattern in a far field;
   illuminating a second diffractive element comprising a 2D array of elements or a grid to form a second diffraction pattern in the far field; and
   determining in the far field at least one of a positional and rotational relationship between a maxima of the first diffraction pattern away from its central maximum and a maxima of the second diffraction pattern away from its central maximum.

2. The method of claim 1, wherein the determining determines the positional relationship.

3. The method of claim 2, wherein the maxima of the first diffraction pattern is an nth-order maxima and the maxima of the second diffraction pattern is an nth-order maxima.

4. The method of claim 2, wherein the maxima of the first diffraction pattern is a zero-order maxima and the maxima of the second diffraction pattern is a zero-order maxima.

5. The method of claim 1, wherein the first diffraction pattern and the second diffraction pattern are radially asymmetric diffraction patterns.

6. The method of claim 1, further comprising aligning the first diffractive element and the second diffractive element using the positional or the rotational relationship.

7. The method of claim 6, wherein the aligning comprises rotating the first diffractive element with respect to the second diffractive element until the positional or the rotational relationship between the first diffraction pattern and the second diffraction pattern is a predetermined positional or rotational relationship.

8. The method of claim 7, wherein the rotating the first diffractive element with respect to the second diffractive element is until the first diffraction pattern substantially overlaps with the second diffraction pattern.

9. The method of claim 7, further comprising the step of repeating the method of claim 1 after rotating the first diffractive element with respect to the second diffractive element.

10. A method of assessing a relative alignment of diffractive elements, comprising:
    illuminating a first diffractive element with diverging light or substantially collimated incoherent light to form a first image of the first diffractive element in a far field;
    illuminating a second diffractive element with diverging light or substantially collimated incoherent light to form a second image of the second diffractive element in the far field; and
    determining a positional relationship between the first image and the second image in the far field.

11. The method of claim 10, wherein a positional relationship between the first image and the second image in the far field is determined by determining a positional relationship between a first feature of the first image and a second feature of the second image.

12. The method of claim 10, further comprising translating the first diffractive element with respect to the second diffractive element based on the determined positional relationship.

13. The method of claim 12, wherein the translating the first diffractive element with respect to the second diffractive element is until the positional relationship between the first image and the second image is a predetermined positional relationship.

14. The method of claim 12, wherein the translating the first diffractive element with respect to the second diffractive element is until one side of the first image is collinear with the corresponding side of the second image.

15. The method of claim 12, further comprising the step of repeating the method of claim 11 after the translating the first diffractive element with respect to the second diffractive element.

16. The method of claim 10, further comprising fixing the first and second diffractive elements on a common plane.

17. The method of claim 10, wherein at least one of the first diffractive elements is a 2D array of elements or a grid and the second diffractive element is a 2D array of elements or a grid.

18. The method of claim 10, wherein the first diffractive element comprises a spatial light modulator; a charge coupled device; a diffractive optical element; a complementary metal-oxide-semiconductor; a micro-electro-mechanical device; or a liquid crystal on silicon device.

19. The method of claim 10, further comprising performing optical correlation between an image corresponding to a first diffraction pattern displayed on the first diffractive element and an image corresponding to a second diffraction pattern displayed on the second diffractive element.

20. The method of claim 10, wherein the first diffractive element and the second diffractive element each comprise a spatial light modulator of an optical correlator, further comprising using the positional relationship for aligning the spatial light modulators.

* * * * *